United States Patent [19]
Aitken et al.

[11] Patent Number: 5,330,940
[45] Date of Patent: * Jul. 19, 1994

[54] FIBERIZABLE ZINC-PHOSPHATE GLASS COMPOSITIONS

[75] Inventors: Bruce G. Aitken, Erwin; George H. Beall, Big Flats; Candace J. Quinn, Corning, all of N.Y.

[73] Assignee: Corning Incorporated, Corning, N.Y.

[*] Notice: The portion of the term of this patent subsequent to Jun. 16, 2009 has been disclaimed.

[21] Appl. No.: 909,406

[22] Filed: Jul. 6, 1992

[51] Int. Cl.$^5$ .............................................. C03C 13/00
[52] U.S. Cl. ........................................ 501/35; 501/38; 501/46; 501/47; 501/48
[58] Field of Search .................. 501/46, 47, 48, 35, 501/38; 65/2

[56] References Cited
U.S. PATENT DOCUMENTS 4,940,677  7/1990  Beall et al. ........................ 501/45
5,122,484  6/1992  Beall et al. ........................ 501/46

*Primary Examiner*—Karl Group
*Attorney, Agent, or Firm*—T. M. Schaeberle

[57] ABSTRACT

This invention relates to a fiberizable glass compositions consisting essentially, expressed in terms of mole percent on the oxide basis, of at least 65% total of 5–55% ZnO, 28–40% $P_2O_5$, 0.3–5% $MoO_3$ and 10–35% $R_2O$, wherein $R_2O$ consists of at least two alkali metal oxides in the indicated proportions selected from the group consisting of 0–25% $Li_2O$, 0–25% $Na_2O$, and 0–25% $K_2O$, and up to 35% total of optional ingredients in the indicated proportions selected from the group consisting of 0–10% $Al_2O_3$, 0–15% $B_2O_3$, 0–15% $Al_2O_3+B_2O_3$, 0–15% $Cu_2O$, 0–25% $Sb_2O_3$, 0–5% F, 0–35% PbO, 0–35% SnO, 0–35% PbO+SnO, 0–5% $ZrO_2$, 0–4% $SiO_2$, 0–20% MgO+CaO+SrO+BaO+MnO, 0–20% MgO, 0–20% CaO, 0–20% SrO, 0–20% BaO and 0–10% MnO, and 0–5% rare earth metal oxide.

6 Claims, No Drawings

FIBERIZABLE ZINC-PHOSPHATE GLASS COMPOSITIONS

BACKGROUND OF THE INVENTION

1. Field of the Invention

The present invention relates to a zinc-phosphate glass composition suitable for continuously making glass fibers which may be used as a reinforcement for high temperature polymer composites.

2. Background of the Invention

The reinforced plastic industry has been using glass fibers in various forms for reinforcing polymer matrices; the glass phase provides increased stiffness and strength to the polymer phase. However, up until now most, if not all, commercially available glass fibers produced for reinforcement were E-glass fibers, i.e. calcium-alumino-silicate glass fibers. However, one disadvantage of these fibers is that the processing temperatures used in making these glass/polymer composites are well below the softening point of these silicate fibers. Therefore, because these fibers are brittle, they are quite prone to breakage during compounding. As a result, the fibers within the composite tend to get chopped up during compounding such that these shortened silicate glass fiber-reinforced polymer composites possess less strength than if the fibers would not have been shortened. Another shortcoming is that these composites are limited as to the proportion of fibers which can be added to the polymer; anything greater than about 20% by volume causes the viscosity of the mixture to be too high for forming at the processing temperature.

With the invention of base alkali metal zinc phosphate glasses exhibiting transition temperatures below 450° C. which possessed good resistance to attack by water in U.S. Pat. No. 4,940,677 (Beall et al.), the possibility of forming composites where a zinc-phosphate glass and a polymer were co-deformable at the polymer processing temperature became possible. That patent discloses glass compositions consisting essentially, expressed in terms of mole percent on the oxide basis, of about 10-35% $R_2O$, wherein $R_2O$ consists of at least two alkali metal oxides in the indicated proportions selected from the group 0-25% $Li_2O$, 0-25% $Na_2O$, and 0-25% $K_2O$, 23-55% XnO, 28-40% $P_2O_5$, and up to 35% total of the following optional ingredients from the group 0-6% $Al_2O_3$, 0-8% $B_2O_3$, 0-8% $Al_2O_3+B_2O_3$, 0-15% CuO, 0-5% F, 0-35% PbO, 0-35% SnO, 0-35% PbO+SnO, 0-5% $ZrO_2$, 0-4% $SiO_2$, and 0-15% MgO+CaO+SrO+BaO+MnO, consisting of 0-10% MgO, 0-10% CaO, 0-10% SrO, 0-12% BaO, and 0-10% MnO.

However, although the above compositions were capable of being drawn into fiber, the ability to continuously draw fibers was not possible. Not only did the produced fiber contain nodules, but additionally the glass devitrified during fiber drawing. Both of these shortcomings of the process were a result of the glass wetting the platinum bushings which resulted in the glass backing up the bushing via capillary wetting and further causing a build-up of the glass upstream from the orifice. Because of this "wetting" problem, the fiber drawing process caused regular breakage of the fiber, as well as shutdowns in order to unclog the orifice by cleaning out the devitrified glass.

SUMMARY OF THE INVENTION

Hence, it is an object of this invention to provide a zinc-phosphate glass composition which could be continuously drawn to form glass fibers.

It is a further object of this invention to provide glass fibers that have reduced forming or drawing temperatures relative to conventional fibers such as E, S or C fibers, which in turn, enable them to be continuously drawn with non-noble metal fiber-drawing systems.

Still another objective of this invention is to provide for glass fibers which will deform at polymer processing or compounding temperatures polymers, thus allowing the formation of glass/polymer composites with a greater proportion of longer glass fibers at temperatures below the annealing point of the glass.

These objectives are achieved in fiberizable glass compositions consisting essentially, expressed in terms of mole percent on the oxide basis, of at least 65% total of 5-55% ZnO, 28-40% $P_2O_5$, 0.3-5% $MoO_3$ and 10-35% $R_2O$, wherein $R_2O$ consists of at least two alkali metal oxides in the indicated proportions selected from the group consisting of 0-25% $Li_2O$, 0-25% $Na_2O$, and 0-25% $K_2O$, and up to 35% total of optional ingredients in the indicated proportions selected from the group consisting of 0-10% $Al_2O_3$, 0-15% $B_2O_3$, 0-15% $Al_2O_3+B_2O_3$, 0-15% $Cu_2O$, 0-25% $Sb_2O_3$, 0-5% F, 0-35% PbO, 0-35% SnO, 0-35% PbO+SnO, 0-5% $ZrO_2$, 0-4% $SiO_2$, 0-20% MgO+CaO+SrO+BaO+MnO, 0-20% MgO, 0-20% CaO, 0-20% SrO, 0-20% BaO and 0-10% MnO, and 0-5% rare earth metal oxide. The rare earth metal oxide is selected from the lanthanide group ($RE_2O_x$) consisting of lanthanum, cerium, neodymium, praseodymium promethium, samarium, europium, gadolinium, terbium, dysprosium, holmium, erbium, thulium, ytterbium and lutecium.

Silicate fibers can be continuously drawn if the glass compositions are melted to homogeneous liquids having melt viscosities suitable for fiber drawing purposes. Typically, these compositions have a melt viscosity of about 1000 to 10,000 poise at the drawing or working temperature. The drawing temperature is preferably at least about 100° C. above the liquidus temperature of the composition. The art discloses that, if these conditions are maintained in silicate fiber formation, devitrification of the molten glass prior to or during fiber forming is avoided. Although the rate of crystallization of phosphate glass is slow compared to silicate glass and thus it is not necessary to draw fiber at a temperature above the liquidus, the phosphate composition does wet the fiber-forming tooling. This phenomenon was observed with Platinum, Platinum/Rhodium, Nickel, stainless steel and Molybdenum tooling. The buildup of phosphate glass, caused by this wetting phenomenon, although slow to crystallize, eventually led to fiber draw shutdown.

The solution to the problem involved the addition of $MoO_3$ to typical zinc-phosphate glass compositions in order to achieve the desired effect of modifying the interfacial tension of the glass composition, such that the molybdenum-doped glass composition does not wet the platinum, or other material, tooling surface. In turn, the glass does not back up the platinum surface via capillary wetting, and, therefore, no buildup of glass will occur upstream from the orifice. Because of this phenomenon, there is no occurrence of the glass forming undesired nodular inclusions or stagnant areas where devitrification could be nucleated and eventually crystallized; thus, in turn, allowing glass fibers to be continuously drawn in a typical fiber drawing operation. As a result of the addition of the MoO3, fibers comprised of compositions within the claimed range were drawn continuously for many hours, even days.

While not intending to be limited by theory, the reason the MoO3-doped zinc phosphate glasses can be continuously drawn into fibers is believed to be due to a reduction in the surface tension of the glass. Assuming no change in the surface tension in the fiber draw tooling, the result of reducing the surface tension of the glass is that the difference in surface energy between the glass and tooling is increased, i.e., an increase in interfacial tension between the two materials, glass and metal. This increase in interfacial tension equates to reduced wetting of the metal fiber tooling surface by the glass composition and the resultant continuous fiber formation capability. However, additions of MoO3 to the glass composition in amounts less than 0.3 mole percent do not provide sufficient reduction in the surface tension of the glass.

The following ranges of composition of glass composition, expressed in terms of mole percent, are preferred for easy drawing; 30–36% $P_2O_5$, 1–4% $Al_2O_3$, 4–8% $Li_2O$, 4–15% $Na_2O$, 3–8% $K_2O$, 31–46% ZnO and 0.5–4% $MoO_3$.

PRIOR ART

Although the use of MoO3 in glass compositions in known to the glass art, it is believed that their use in zinc-phosphate glass compositions exhibiting transition temperatures below about 450° C. to achieve the ability of continuous fiber drawing is novel. The most relevant prior art is U.S. Pat. No. 5,122,484 (Beall et al.) which discloses a glass exhibiting a transition temperature no higher than 425° C. and excellent resistance to attack by water consisting essentially, expressed in terms of weight percent on the oxide basis, of about 38–50% $P_2O_5$, 0–5% $Al_2O_3$, 2–10% $Na_2O$, 0.75–5% $Li_2O$, 2–10% $K_2O$, 5–25% $Na_2O+Li_2O+K_2O$, 28–40% ZnO, 0–10% $MoO_3$, 0–10% $WO_3$, 2–15% $MoO_3+WO_3$, 0–10% $SnO_2$, 0–8% Cl (analyzed) 2–25% $SnO_2+MoO_3+WO_3$ Cl. Unlike the instant invention, wherein the addition of MoO3 is required to reduce the surface tension of the glass composition, the Beall et al. reference requires the presence of either MoO3 and/or WO3 in order to reduce the viscosity of those glass compositions so that the flow properties were comparable to lead-containing frits. In other words, not only is MoO3 not required component, but also the purpose for the presence of WO3 and/or MoO3 in the Beall et al. composition is different from that in the present inventive fiberizable glass composition.

DESCRIPTION OF THE PREFERRED EMBODIMENTS

TABLE I reports three MoO3-doped compositions, expressed in terms of mole percent on the oxide basis as calculated from the batch, which were able to be continuously drawn into fiber; without the MoO3 addition the glass wet the fiber forming tooling resulting in the devitrification problem described above. It was discovered that a simple, yet effective test of the ability to be continuously drawn into fiber, i.e., the ability to not wet fiber forming tooling, involved a "ring test". A nichrome wire ring was dipped into each glass composition at viscosities below 100 poise, i.e., at temperatures between 800 and 900° C., and the ability of the glass to form a continuous ring both with a large diameter (1⅜") and a small diameter ring (⅞") was noted. If the glass composition formed a continuous ring with both, it was determined that the composition would be able to be continuously drawn into fiber. Note that all three examples doped with molybdenum easily formed continuous rings, i.e., they passed the "ring test".

In referring now to TABLE II, the effect of the MoO3 addition can be seen; all four examples possess the same base composition, yet the only one which passed the "ring test" is 1.0% MoO3-doped Example 9. Although Examples 10 and 19 did contain MoO3, the amounts were less than 0.3%, by mole, and therefore not sufficient. Note Example 5, which, although it contained a 2% WO3 addition which was expected to cause the same effect as molybdenum, did not pass the "ring test".

TABLE III records a number of glass compositions, including those earlier discussed, expressed in terms of mole percent on the oxide basis as calculated from the batch, illustrating both the inventive glasses which could be continuously drawn into fiber, as well as other compositions which do not contain the inventive MoO3 addition. Inasmuch as the sum of the individual constituents total or closely approximates 100, for all practical purposes the value reported for each component may be considered to reflect mole percent. TABLE IIIA reports the same compositions, but wherein the values have been converted to weight percent. The actual batch ingredients for the glasses can comprise any materials, either the oxides or other compounds which, upon being melted together, will be converted to the desired oxides in the proper proportions.

In referring to TABLE III it should be pointed out that all of those compositions containing 0.3 mole percent MoO3 or greater passed the "ring test", and thus should be able to be continuously drawn into fiber without any devitrification problems.

The batch materials were compounded, ballmilled together to aid in securing a homogeneous melt, and then charged into silica crucibles. After placing lids thereon, the crucibles were introduced into a furnace operating between 1100° and 1200° C. and maintained at that temperature for about 3–4 hours. Each melt was poured as a fine stream into a bath of tap water to form particles of glass, a practice termed "drigaging" in the glass art. The drigaged particles were dried and thereafter milled to form cullet. This cullet was then either used in the fibermaking process or remelted and used in the "ring test".

TABLE I

|  | 12 | 13 | 6 |
|---|---|---|---|
| $P_2O_5$ | 32.5 | 33 | 32 |
| $Al_2O_3$ | 2 | 2 | 1.9 |
| $Na_2O$ | 6.8 | 8 | 6.8 |
| $Li_2O$ | 6 | 5 | 6 |
| $K_2O$ | 6.8 | 4 | 6.8 |
| ZnO | 43 | 35 | 43.4 |
| $MoO_3$ | 3.5 | 3 | 3.5 |
| MgO | — | 4 | — |
| CaO | — | 4 | — |
| BaO | — | 3 | — |

TABLE II

|  | 1 | 5 | 9 | 10 |
|---|---|---|---|---|
| $P_2O_5$ | 33 | 33 | 33 | 33 |
| $Al_2O_3$ | 2 | 2 | 2 | 2 |
| $Li_2O$ | 6 | 6 | 6 | 6 |

TABLE II-continued

|  | 1 | 5 | 9 | 10 |
|---|---|---|---|---|
| Na$_2$O | 7 | 7 | 7 | 7 |
| K$_2$O | 7 | 7 | 7 | 7 |
| ZnO | 43 | 43 | 42.5 | 43 |
| SiO$_2$ | 2 | — | 1.5 | 1.9 |
| MoO$_3$ | — | — | 1.0 | 0.1 |
| WO$_3$ | — | 2 | — | — |
| ring test | no | no | yes | no |

The process of drawing fiber first involved melting and fining the glass batch, i.e., the earlier described cullet. Preferably, the process involved fining the glass batch between about 1 to 2 hours at a temperature between about 900°–1100° C. Following fining glass fibers were then drawn at a drawing temperature at which the compositions had a melt viscosity of about $10^6$ to $10^4$ poise. In the preferred embodiment the drawing temperature was 450° to 525° C. Note that, because of the slower crystallization of phosphate glasses as compared to silicate glasses, it was not necessary to draw fibers at a temperature at least 100° C. above the liquidus. It was only necessary to draw fiber at a temperature such that the glass would fall on its own leaving a fiber trail behind; glass which is too hot will stream on its own while glass which is too cold will clog the nozzle due to devitrification. These MoO$_3$ containing compositions were capable of being drawn into fibers having diameters ranging between 1 to 100 microns, with diameters on the order of 15 to 20 microns being most easily drawn. Nevertheless, it should be noted that fibers as fine as 6 microns were successfully drawn for extended periods of time. Fibers were successfully drawn using various tooling materials other than platinum, including nickel platinum-rhodium and molybdenum.

Whereas the above description reflects laboratory melting and forming practice only, it will be appreciated that the recited compositions are capable of being melted in large scale melting units and being made into fiber, utilizing forming techniques conventional in the glassmaking and fiberglass art, although modified as described above for the phosphate composition.

TABLE III

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| P$_2$O$_5$ | 33 | 33 | 32.5 | 33 | 33 | 32 | 33 | 33 | 33 | 33 | 34 | 32.5 | 33 | 32.5 | 35 | 32.5 | 33 | 33 | 33 |
| Al$_2$O$_3$ | 2 | 2 | 2 | 2 | 2 | 1.9 | 2 | 2 | 2 | 2 | 2 | 2 | 2 | 0.5 | 0.5 | 0.5 | 2 | 2 | 2 |
| Li$_2$Cl$_2$ | — | — | — | 5 | — | — | — | — | — | — | — | — | — | — | — | — | — | — | — |
| Li$_2$O | 6 | 7 | 7 | — | 6 | 5.7 | 7 | 6 | 6 | 6 | 7 | 6 | 5 | 7 | 7 | 7 | 7 | 7 | 7 |
| Li$_2$F$_2$ | — | — | — | 8 | — | — | — | — | — | — | — | — | — | — | — | — | — | — | — |
| Na$_2$O | 7 | 8 | 16 | 9 | 7 | 6.8 | 8 | 7 | 7 | 7 | 14 | 6.8 | 8 | 8 | 8 | 8 | 7 | 7 | 7 |
| K$_2$O | 7 | 5 | 5 | — | 7 | 6.8 | 5 | 7 | 7 | 7 | 4 | 6.8 | 4 | 5 | 5 | 5 | 7 | 7 | 7 |
| K$_2$Cl$_2$ | — | — | — | 5 | — | — | — | — | — | — | — | — | — | — | — | — | — | — | — |
| ZnO | 43 | 40 | 27 | 38 | 43 | 43.4 | 45 | 43 | 42.5 | 43 | 32 | 44 | 35 | 23.5 | 7.5 | 10 | 39.5 | 42.8 | 42.9 |
| SnO | — | 5 | 4 | — | — | — | — | — | — | — | — | — | — | 1.0 | 1 | 1 | — | — | — |
| SiO$_2$ | 2 | — | 1.5 | — | — | — | — | 1.5 | 1.5 | 1.9 | — | — | — | — | 1 | 1 | — | 1.9 | 1.9 |
| CaO | — | — | 2 | — | — | — | — | — | — | — | 2 | — | 4 | — | 10 | — | — | — | — |
| BaO | — | — | 3 | — | — | — | — | — | — | — | 2 | — | 3 | — | 3.5 | 3.5 | — | — | — |
| MoO$_3$ | — | — | — | — | — | 3.5 | 2 | 0.5 | 1.0 | 0.1 | 2 | 2 | 3 | 2.5 | 2.5 | 2.5 | 2.5 | 0.3 | 0.2 |
| WO$_3$ | — | — | — | — | 2 | — | — | — | — | — | — | — | — | — | — | — | — | — | — |
| Sb$_2$O$_3$ | — | — | — | — | — | — | — | — | — | — | — | — | — | 20.0 | — | — | — | — | — |
| MgO | — | — | — | — | — | — | — | — | — | — | — | — | 4 | — | — | — | — | — | — |
| CeO$_2$ | — | — | — | — | — | — | — | — | — | — | — | — | — | — | — | — | 2 | — | — |
| ring test | no | no | no | no | no | yes | yes | yes | yes | no | yes | yes | yes | yes | yes | yes | yes | yes | no |

TABLE IIIA

|  | 1 | 2 | 3 | 4 | 5 | 6 | 7 | 8 | 9 | 10 | 11 | 12 |
|---|---|---|---|---|---|---|---|---|---|---|---|---|
| P$_2$O$_5$ | 47.6 | 46.5 | 46.7 | 46.5 | 46.2 | 46.5 | 46.7 | 46.7 | 47.5 | 47.8 | 49.2 | 46.4 |
| Al$_2$O$_3$ | 2.08 | 2.03 | 2.04 | 2.03 | 2.02 | 2.03 | 2.04 | 2.08 | 2.07 | 2.09 | 2.08 | 2.06 |
| Li$_2$Cl$_2$ | — | — | — | 4.2 | — | — | — | — | — | — | — | — |
| Li$_2$O | 2.37 | 2.71 | 2.72 | — | 1.78 | 1.7 | 2.1 | 1.83 | 1.83 | 1.84 | 2.15 | 1.81 |
| Li$_2$F$_2$ | — | — | — | 3.55 | — | — | — | — | — | — | — | — |
| Na$_2$O | 4.42 | 4.93 | 9.90 | 5.55 | 4.29 | 4.2 | 4.96 | 4.42 | 4.41 | 4.44 | 8.87 | 4.25 |
| K$_2$O | 6.69 | 4.68 | 4.69 | — | 6.5 | 5.33 | 4.70 | 6.70 | 6.68 | 6.73 | 3.84 | 6.44 |
| K$_2$Cl$_2$ | — | — | — | 7.41 | — | — | — | — | — | — | — | — |
| ZnO | 35.6 | 32.4 | 21.9 | 30.7 | 34.6 | 35.2 | 36.6 | 35.6 | 35.1 | 35.8 | 26.6 | 36.1 |
| SnO | — | 6.7 | 5.38 | — | — | — | — | — | — | — | — | — |
| SiO$_2$ | 1.22 | — | 0.9 | — | — | — | — | 0.92 | 0.91 | 1.17 | — | — |
| CaO | — | — | 1.12 | — | — | — | — | — | — | — | 1.14 | — |
| BaO | — | — | 4.59 | — | — | — | — | — | — | — | 3.13 | — |
| MoO$_3$ | — | — | — | — | — | 4.95 | 2.84 | 0.72 | 1.44 | 0.15 | 2.9 | 2.86 |
| WO$_3$ | — | — | — | — | 4.58 | — | — | — | — | — | — | — |

|  | 13 | 14 | 15 | 16 | 17 | 18 | 19 | 20 |
|---|---|---|---|---|---|---|---|---|
| P$_2$O$_5$ | 46.6 | 32.7 | 34.8 | 32.7 | 46.3 | 47.8 | 47.8 | 45.5 |
| Al$_2$O$_3$ | 2.04 | 0.4 | 0.4 | 0.4 | 2.0 | 2.1 | 2.1 | 7.4 |
| Li$_2$Cl$_2$ | — | — | — | — | — | — | — | — |
| Li$_2$O | 1.5 | 1.5 | 1.5 | 1.5 | 2.1 | 1.8 | 1.8 | 2.0 |
| Li$_2$F$_2$ | — | — | — | — | — | — | — | — |
| Na$_2$O | 4.95 | 3.5 | 3.5 | 3.5 | 4.3 | 4.4 | 4.4 | 4.2 |
| K$_2$O | 3.75 | 3.3 | 3.3 | 3.3 | 6.5 | 6.7 | 6.7 | 6.4 |
| K$_2$Cl$_2$ | — | — | — | — | — | — | — | — |
| ZnO | 28.4 | 32.7 | 34.8 | 32.7 | 46.3 | 47.8 | 47.8 | 45.5 |
| SnO | — | 1.1 | 1.1 | 1.1 | — | — | — | — |
| SiO$_2$ | — | — | — | — | — | 1.2 | 1.2 | — |
| CaO | 2.23 | 3.9 | 4.0 | — | — | — | — | — |

TABLE IIIA-continued

| | | | | | | | | |
|---|---|---|---|---|---|---|---|---|
| BaO | 4.25 | 3.8 | 3.8 | — | — | — | — | — |
| MoO$_3$ | 4.25 | 2.6 | 2.5 | 2.6 | 3.6 | 0.4 | 0.4 | 4.2 |
| WO$_3$ | 4 | — | — | — | — | — | — | — |
| CeO$_2$ | — | — | — | — | 3.4 | — | — | — |
| Sb$_2$O$_3$ | — | 41.3 | 40.9 | 41.3 | — | — | — | — |

Generally, the fibers formed from the disclosed fiberizable compositions had good tensile strengths and modulus of elasticities so as to not be too rigid and brittle. TABLE II reports data of three fiber compositions which are representative of those properties possessed by typical fibers formed within the composition range. TABLE IV reports the liquidus temperature each glass composition possessed in a fiber draw process at the platinum tooling surface (liquidus-Pt.) and at the center of the fiber being drawn (liquidus-int.), the viscosity of the glass at the Platinum surface liquidus (viscosity at Pt liquidus) and the glass transition temperature ($T_g$). Example 12 comprised the most preferred embodiment of the inventive glasses.

TABLE IV

| | 12 | 6 | 13 |
|---|---|---|---|
| liquidus (int.) | 530° C. | 680° C. | 660° C. |
| liquidus (Pt) | 560° C. | 760° C. | 680° C. |
| anneal point | 314° C. | 318° C. | 350° C. |
| strain point | 296° C. | 297° C. | 330° C. |
| viscosity at pt liquidus (poise) | 1000 | <100 | 100 |
| Young's Modulus ($\times 10^6$) | 8.14 | 8.2 | 9.09 |
| bulk density (g/cc) | 3.06 | X | 3.14 |
| Coef. of thermal expansion ($\times 10^{-7}$) | 135.5 | 133.5 | 126 |
| Tg | 334° C. | 338° C. | ~353° C. |

We claim:

1. Fiberizable glass compositions consisting essentially, expressed in terms of mole percent on the oxide basis, of at least 65% total of 10–55% ZnO, 28–40% P$_2$O$_5$, 0.2–5% MoO$_3$, 10–35% R$_2$O, wherein R$_2$O consists of at least two alkali metal oxides in the indicated proportions selected from the group consisting of 0–25% Li$_2$O, 0–25% Na$_2$O, and 0–25% K$_2$O and up to 35% total of optional ingredients in the indicated proportions selected from the group consisting of 0–10% Al$_2$O$_3$, 0–15% B$_2$O$_3$, 0–15% Al$_2$O$_3$+B$_2$O$_3$, 0–15% Cu$_2$O, 0–5% F, 0–25% Sb$_2$O$_3$, 0–35% PbO, 0–35% SnO, 0–35% PbO+SnO, 0–5% ZrO$_2$, 0–4% SiO$_2$, 0–20% MgO+CaO+SrO+BaO+MnO, 0–20% MgO, 0–20% CaO, 0–20% SrO, 0–20% BaO and 0–10% MnO, and 0–5% rare earth metal oxide.

2. The glass according to claim 1 consisting essentially of 30–36% P$_2$O$_5$, 1–4% Al$_2$O$_3$, 4–8% Li$_2$O, 4–15% Na$_2$O, 3–8% K$_2$O, 31–46% ZnO and 0.5–4% MoO$_3$.

3. The glass according to claim 1 consisting essentially of 32.5% P$_2$O$_5$, 2% Al$_2$O$_3$, 6% Li$_2$O, 6.8% Na$_2$O, 6.8% K$_2$O, 44% ZnO and 2% MoO$_3$.

4. A method of making glass fibers comprising the steps of:
   a. melting a batch for a glass composition consisting essentially, expressed in terms of mole percent on the oxide basis, of at least 65% total of 10–55% ZnO, 28–40% P$_2$O$_5$, 0.2–5% MoO$_3$, 10–35% R$_2$O, wherein R$_2$O consists of at least two alkali metal oxides in the indicated proportions selected from the group consisting of 0–25% Li$_2$O, 0–25% Na$_2$O, and 0–25% K$_2$O and up to 35% total of optional ingredients in the indicated proportions selected from the group consisting of 0–10% Al$_2$O$_3$, 0–15% B$_2$O$_3$, 0–15% Al$_2$O$_3$+B$_2$O$_3$, 0–15% Cu$_2$O, 0–5% F, 0–25% Sb$_2$O$_3$, 0–35% PbO, 0–35% SnO, 0–35% PbO+SnO, 0–5% ZrO$_2$, 0–4% SiO$_2$, 0–20% MgO+CaO+SrO+BaO+MnO, 0–20% MgO, 0–20% CaO, 0–20% SrO, 0–20% BaO and 0–10% MnO, and 0–5% rare earth metal oxide;
   b. fining the glass melt; and,
   c. drawing fibers from the glass melt at a temperature at which the melt has a viscosity of about $10^6$ to $10^8$ poise.

5. The method according to claim 4 wherein the glass composition consists of 32–36% P$_2$O$_5$, 1–4% Al$_2$O$_3$, 5–8% Li$_2$O, 6–15% Na$_2$O, 3–8% K$_2$O, 0.3–4% MoO$_3$ and 31–46% ZnO.

6. The method according to claim 4 wherein the glass composition consists of 32.5% P$_2$O$_5$, 2% Al$_2$O$_3$, 6% Na$_2$O, 6.8% K$_2$O, 3.5% MoO$_3$ and 44% ZnO.

* * * * *

UNITED STATES PATENT AND TRADEMARK OFFICE
CERTIFICATE OF CORRECTION

PATENT NO. : 5,330,940

DATED : July 19, 1994

INVENTOR(S) : Aitken et al.

It is certified that error appears in the above-indentified patent and that said Letters Patent is hereby corrected as shown below:

Title page, item [75] Inventors: "Ahmad Sarhangi, Painted Post, NY" should be listed as the fourth inventor.

Column 1, line 47, "XnO" Should be --ZnO

Column 3, line 25, "Na2O" should read --$Na_2O$--.

Column 3, line 29, "MoO3 in glass compositiors in" should read --$MoO_3$ in glass compositions is--.

Column 3, line 43, "$WO_3$ Cl" should be --$WO_3$+Cl--.

Column 6, Table III, Example 15, the $SiO_2$ amount of "1" should be -- -- --.

Column 6, Table III, Example 16, the $SiO_2$ amount of "1" should be -- -- --.

Column 7, line 11, "TABLE II" should read --TABLE IV--.

Column 8, line 40, "$10_8$" should read --$10^8$--.

UNITED STATES PATENT AND TRADEMARK OFFICE
CERTIFICATE OF CORRECTION

PATENT NO. : 5,330,940
DATED : July 19, 1994
INVENTOR(S) : Aitken et al.

It is certified that error appears in the above-indentified patent and that said Letters Patent is hereby corrected as shown below:

Column 8, line 46-47, "6% $Na_2O$" should be --6% $Li_2O$, 6.8% $Na_2O$--.

Signed and Sealed this

Twentieth Day of December, 1994

Attest:

BRUCE LEHMAN

Attesting Officer     Commissioner of Patents and Trademarks